Sept. 18, 1923.  H. F. TAYLOR  1,468,050
REFRIGERATING SYSTEM.
Filed June 25, 1921  2 Sheets-Sheet 1
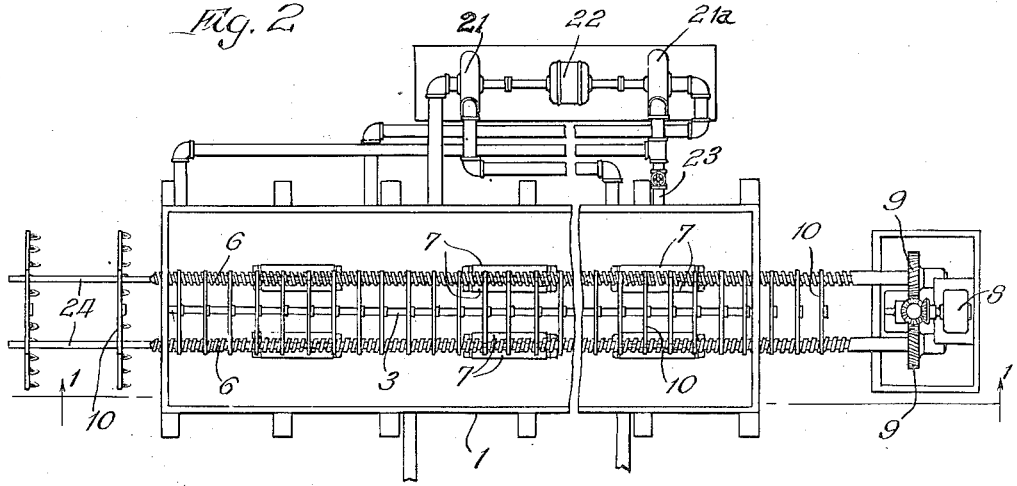
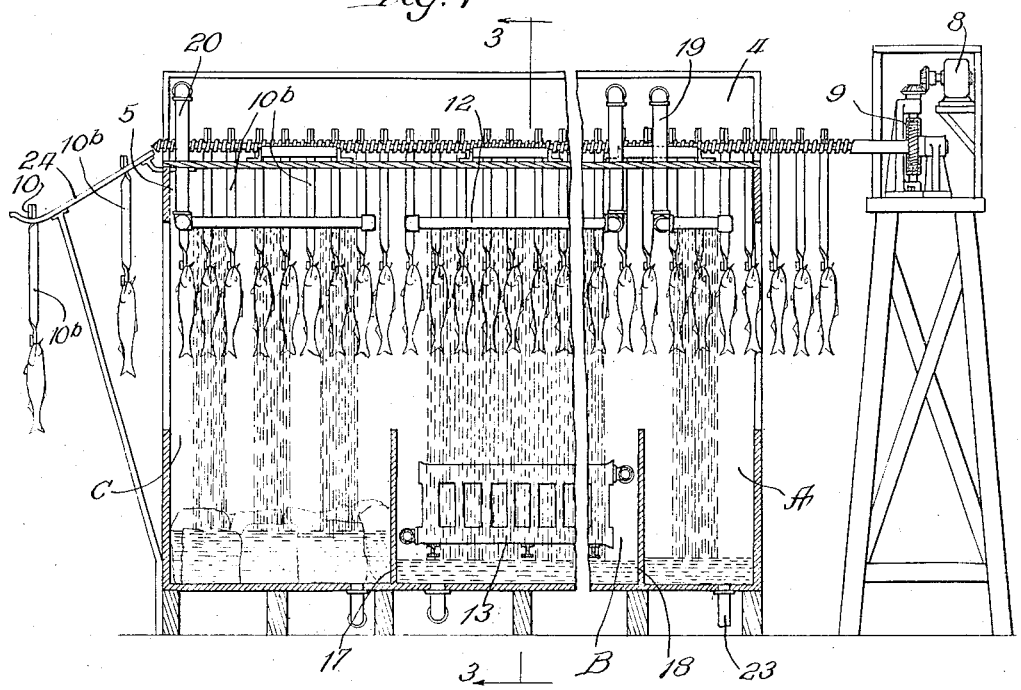

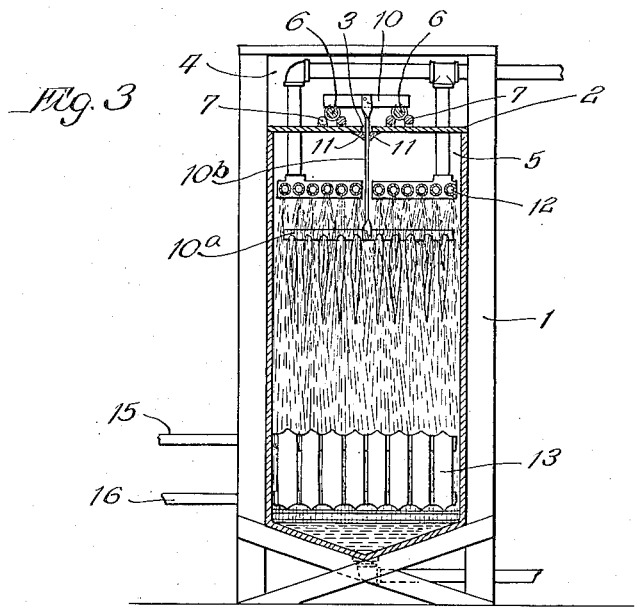
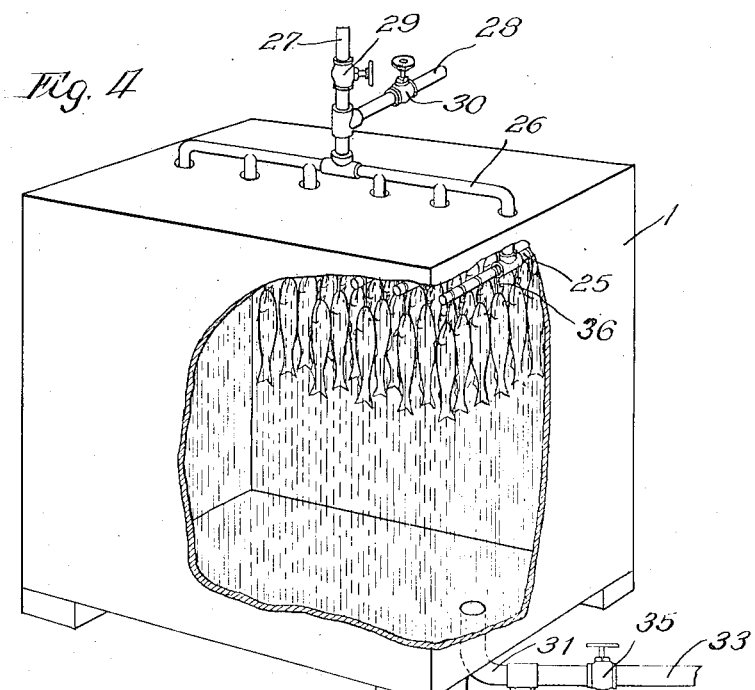

Patented Sept. 18, 1923.

1,468,050

UNITED STATES PATENT OFFICE.

HARDEN F. TAYLOR, OF CHICAGO, ILLINOIS.

REFRIGERATING SYSTEM.

Application filed June 25, 1921. Serial No. 480,405.

*To all whom it may concern:*

Be it known that I, HARDEN F. TAYLOR, a citizen of the United States, residing at Chicago, in the county of Cook and State of Illinois, have invented new and useful Improvements in Refrigerating Systems, of which the following is a full, clear, concise, and exact description, reference being had to the accompanying drawing, forming a part of this specification.

My invention relates to the preservation of comestibles and it has especial relation to the provision of refrigerating apparatus wherein a liquid refrigerant is caused to come into contact with the goods to be frozen, thereby extracting the heat from the latter and leaving them in chilled or frozen state and in desirable condition for consumption, shipment or storage.

In the preservation of comestibles, such as fish, it is recognized that rapid freezing produces a frozen article of better quailty than does slower freezing. Slow freezing causes injury to the tissue structures of the comestibles which results in undesirable changes taking place, whereas in rapid freezing the injury to the tissues is greatly reduced or entirely avoided. It is also recognized that the more rapid freezing or chilling may be effected by bringing into direct contact with the fish or other comestibles to be frozen, a fluid medium of high specific heat and thermal conductivity, such, for instance, as brines, solutions of glycerine or alcohol, or other liquid substances, solutions or mixtures, which have been cooled to a low temperature.

Fish, or other comestibles, may be frozen individually and it is true that extremely large fish are commonly treated in this manner, but it is exceedingly impracticable to freeze or chill small fish individually and they are therefore generally packed in pans or molding forms whereby the comestibles are frozen together to form a solid cake. It is a common practice to obtain the benefits of the more rapid freezing, which is possible if the goods are treated individually, by placing them in cold air rooms which are known as "sharp freezers". In such a room the evaporation of moisture is excessive and it is, therefore, necessary,—to obtain the best results,—that the individual treatment of the comestibles be carried on in liquid refrigerating media. In the latter the evaporation of moisture is, of course, avoided but because of the present manner of subjecting the goods, and especially goods having an extreme length compared with their width, such as fish, to the liquid refrigerant, the comestibles become curved or otherwise distorted from their original straight shape whereby they cannot be conveniently handled or economically packed in containers for shipping or storage. Moreover, there are further disadvantages inherent in individually freezing comestibles in a liquid medium, such for instance as the labor involved in handling, particularly in the case of the smaller species of fish, such labor, in the latter case, being so excessive and the employment thereof so uneconomical, that treating such fish in bulk and endeavoring to freeze them individually is impracticable and so difficult as to be substantially a theoretical method of treatment only.

Another disadvantage which occurs when fish are individually frozen under the present method is the difficulty which is encountered in maintaining the desired rate of flow, as well as the proper distribution, over the surface of the fish since, as above intimated, the rate of freezing is in some measure proportional to the speed of flow of the refrigerant over the surface of the comestibles.

Again, while the common practice of packing fish and other comestibles in pans or containers previous to freezing them secures the advantage of simpler handling after the fish have once been packed, there are numerous disadvantages which are inherent in even this well recognized method of comestible treatment. The diminished evaporation and oxidation which occurs because of the reduced surface which is directly exposed to the action of the refrigerant, are particularly annoying as well as is the breakage of heads, fins and tails which occurs in the packing and freezing operations. Whatever advantages may result from this method of freezing are moreover offset or neutralized, in a large measure, by the slower freezing which results in bringing together of numerous small articles having a large surface into one large composite mass, the latter having a comparatively small surface through which heat may be extracted by the refrigerating medium, Again, even in this form of treatment the close packing of the fish in pans or containers causes them to assume, because of the pressure against the pan as well as against each other, a distorted or angular shape, so that, both while frozen and even after having been defrosted, they no longer possess much of their original attractive shape and appearance and are, therefore, of a considerably less merchantable quality than they might otherwise be.

Another disadvantage which results from the formation of the smaller fish into cakes is the difficulty which is encountered when one wishes to utilize but one or two fish, or only a part of a frozen cake. When it is desired to so separate the cake into portions it is very difficult to remove part of a cake, or one fish, without causing damage to all the surrounding frozen goods or without defrosting the entire cake. It is, therefore, necessary, in case only a portion of the cake is desired for use or sale, either to damage the fish by forcibly removing them while still frozen or to defrost the entire cake and thereafter again freeze those which are not wanted—the latter practice being one which is highly injurious to the goods.

Other disadvantages which are inherent in the present methods of treating fish results from the considerable handling to which the comestibles are subjected since, of course, it is usual to first wash or clean the fish thoroughly before freezing and, moreover, after freezing the fish are usually glazed to protect them against evaporation of moisture, rusting of fats, etc. All of these operations necessitate frequent handling and moving from place to place for the washing, panning, freezing and glazing, to the great multiplication of labor, consumption of time, increase in expense, as well as the necessary rendering of the fish less suitable for the market by such handling.

Finally, in those methods of freezing in liquid refrigerants, with which I am familiar and which demand the immersion of the fish in the liquid refrigerant, a very large quantity of such a refrigerant is necessary and such excessive quantity contributes not only to the expense, particularly where the medium contains glycerine, but also makes the cooling off of the system preparatory to freezing a protracted operation. In this same connection it should be remembered that many mechanical and operating difficulties are encountered because of the buoying effect, on the fish, of the dense brine or other refrigerating solution.

My invention, therefore, contemplates the provision of a method of comestible treatment and an apparatus for practicing such a method, wherein the above disadvantages are eliminated and a number of desirable features realized. While the apparatus and method by which these advantages are gained will be more readily understood after a consideration of the hereinafter description of said method and apparatus, said advantages may be summarized as follows:

The fish are held perfectly straight during the chilling or freezing, so that they possess an appetizing appearance and, moreover, may be advantageously packed for shipment or storage in a minimum space; after being frozen, they may be separated and used individually without damaging or without defrosting those which are not needed; they may be washed, frozen and glazed, in one continuous operation, if desired, with little or no handling throughout the entire process; inasmuch as all of the available surface of the comestibles is exposed to the refrigerant, they are frozen in the shortest possible time, this being due, to a large extent, to the manner in which the refrigerant and comestible move relatively to distribute said refrigerant at a rapid rate entirely over the comestible surface; the quantity of refrigerant which is necessary in my apparatus is reduced to a minimum while, as above intimated, the continuity of operation may be unbroken, if, as is usually required, it is desirable; and, all the difficulties which arise from the immersion of the comestibles in the buoying brine are overcome.

In practicing my invention a liquid refrigerating medium, such as brine, is sprayed or sprinkled over the comestibles which are individually suspended by suitable means from a stationary or movable support. By thus being hung vertically, and apart each from the other, the liquid refrigerant strikes and flows rapidly down over every portion of each comestible whereby a chilling or freezing is effected. Where continuity of operation is desired the above mentioned supports are made movable and serve to move the comestibles entirely through my apparatus.

For a better understanding of my invention both as to method and the apparatus in which such method is employed, reference may be had to the accompanying drawings; in which—

Fig. 1 is a side sectional and elevational view of an apparatus whereby my method may be practiced;

Fig. 2 is a plan view of the apparatus shown in Fig. 1;

Fig. 3 is an end elevational view taken on the line 3—3 of Fig. 1; and

Fig. 4 is an illustration of another embodiment of my invention.

My refrigerating apparatus comprises a long chamber 1, and it will be noted from the drawings that I have illustrated this chamber as longitudinally reduced by striking out certain portions thereof and showing only enough of the different portions as to clearly point out my invention. Near the top the chamber is horizontally divided by a false ceiling 2 through which runs a narrow lengthwise slot 3, two compartments, 4 and 5, thus being formed and being adapted to communicate with each other through the slot 3. On this ceiling and in compartment 4 are mounted two spirally threaded conveyors 6 which rest on a plurality of roller bearings 7, said conveyors being driven by a motor 8 through the medium of a gear set 9 so that they turn in opposite directions.

Adapted to be mounted upon these conveyors and be carried along in the spiral grooves thereof are metal carriers 10 which are made of thin strips, riveted together as shown, and provided with hooks $10^a$ to receive the fish or other comestibles. The middle or vertical piece of the carrier $10^b$ extends through the slot 3 in the ceiling 2 whereby the mechanical conveyor parts are entirely isolated from the action of the various media present in the compartment 5. This slot is further sealed by a rubber or metal strip 11 which may be of such elasticity as to cause the two compartments to be entirely separated from each other except at the points where the carriers split the strip portions apart. Near the top of the compartment 5 are a plurality of longitudinally extending pipes 12 extending lengthwise along a considerable portion of the compartment 5. These pipes are provided with perforations from which the refrigerating medium issues, flowing down and running over the fish or other comestibles. After passing over the comestibles, said refrigerant passes over heat absorbing members 13, collects in the bottom and is returned by a pump, to again flow over the fish whereby it is continuously cooled and continuously utilized. Ammonia or other volatile refrigerating medium enters the radiators at 15 and is discharged at 16, connections being made with an ordinary refrigerating machine, not shown. It will be noted that the lower compartment of my apparatus is divided by short partitions 17 and 18 into three zones and through an arrangement comprising pipes 19, similar to the pipes 12 heretofore described, the fish, which enter the chamber and pass into the zone A, have cold cleansing water passed or showered over them preliminary to their entrance into zone B where they are subjected to the freezing or chilling operation. Subsequently, when the fish pass into the zone C they have water at a temperature of approximately zero degrees centigrade passed over them. This latter, issuing from a system of pipes 20, first washes all of the refrigerant which may cling to the comestibles and thereafter glazes each individual fish with a covering of any desired thickness, the thickness of this glazing covering, as well as the rate or intensity of chilling or freezing, being adjustable through governing the rate of flow of media to the various zones through which the fish are passing. I have shown ice as being placed under the glazing sprays in the zone C whereby the glazing water is kept at a sufficiently low temperature. The refrigerating liquid and the water are respectively caused to circulate by means of pumps 21 and $21^a$, which are driven by a motor 22, 23 being an inlet pipe for the water supply and $23^a$ being a drain pipe through which the used water is removed.

The carriers, after leaving the screw conveyors are led down rails 24 to convenient points for removing the fish from the hooks and thereafter packing the same.

Having described but one embodiment of my invention, the operation thereof is as follows:

The fish are attached to the carriers whereby they hang in substantially vertical position and, no matter what treatment they are subjected to, their weight along in the original position will be sufficient to maintain them against curling or other distortion. The carriers are placed across the spiral conveyors at the right of the apparatus shown in Fig. 1 and are successively carried into zone A of the apparatus. In this zone they are thoroughly showered with water and cleansed. The rate at which they pass through the zones is, of course, adjusted to the particular circumstances and it is to be observed that a space is left between the showers in the zones A and B wherein the fish may drain and become ready for the freezing operation. They then pass over the partition 18 and into the zone B wherein the refrigerant flowing thereover freezes each individual comestible and, as hereinbefore described, the refrigerant is continuously utilized and cooled whereby a minimum amount is used with a maximum freezing effect. The movement through this zone is so regulated that by the time the fish emerge therefrom, they are frozen quite hard. Of course, if it is desired, the conveyor may be stopped for a short length of time to permit of more intense freezing.

Upon emerging from the freezing zone B the comestibles are showered in zone C with very cold water which washes off the brine and initiates glazing. After the fish emerge from the glazing zone they slide down the rail 24 whereupon the carriers may be taken to the point where the comestibles are to be removed therefrom and packed.

It will be observed from the above description that by utilizing my method of comestible treatment wherein the articles are moved relatively to the media to distribute the refrigerant most efficiently over the body of the comestible and wherein the process is substantially continuous embodying all the necessary operations, a very rapid refrigeration of individual comestibles is effected. Moreover, such refrigeration is effected without imparting to the comestibles all of those undesirable characteristics, which were hereinbefore disclosed, as inherent in the other systems of freezing, both in cake form and in the few cases that individual freezing of the smaller fish is employed.

The amount of labor and the time of operation are sharply reduced and in addition thereto the extreme advantage of comparatively no handling is realized.

Finally, although the apparatus whereby my invention may be practiced is highly efficient in operation it is nevertheless comparatively simple in structure and not costly to build.

In Fig. 4 I have illustrated another embodiment of my invention for freezing comestibles while supported in substantially vertical position and in this particular apparatus I have illustrated means for supplying the various treating media to the comestibles which is highly efficient and very simple in operation although a minimum number of parts and pipes are used.

In this figure the chamber 1 is undivided by partitions. A plurality of pipes 25 are supplied through a header 26 which may be connected to a pipe 27 or a pipe 28, as desired, by manipulating the valves 29 and 30. At the bottom of the chamber a drain 31 serves to direct the media falling in the chamber through either pipe 32 or 33 by proper manipulation of the valves 34 and 35.

In this apparatus the fish are suspended on individual hooks 36 which serve to suspend them vertically from the pipes 25, the latter being perforated to permit liquids fed therethrough to shower over the fish suspended therefrom.

For the purpose of this illustration I have assumed that the pipe 28 is connected to the cold water supply while the other pipe 27 is connected to a pump and to some refrigerating machine, not shown. The operation of the embodiment of my invention just illustrated is as follows:

The fish or other comestibles are suspended, as shown, and the valves 30 and 34 are open, the machine being closed, whereupon cold water enters the header 26 and is distributed over the comestibles suspended in the chamber to wash them off thereafter being discharged through the drain 32. These two valves are then closed and the others are opened whereby cold brine or other refrigerating medium is sprayed thereover, whereafter said refrigerating medium is drawn through the pipe 33 by a pump and returned to the header. Again, after the comestibles have been frozen the valves 34 and 30 are again opened, the valves 29 and 35 being closed, whereupon the cold water is sprayed over the fish to wash off the adhering refrigerant and to glaze them, whereafter they are removed for packing.

The last embodiment of my invention which I have illustrated is particularly suited to the treatment of very bulky and heavy fish. In both of the above embodiments of my invention it will be noted that the suspension of them in vertical manner is productive of very desirable features in the frozen articles and while I have shown but these two embodiments of my invention it is obvious that many modifications thereof may occur to those skilled in the art and I desire, therefore, that my invention be limited only by the showing of the prior art and by the scope of the appended claims.

Having thus described my invention what I now claim as new and desire to secure by Letters Patent is:

1. The method of treating fish or other goods having one long dimension, which consists in suspending them in substantially vertical position, passing a liquid refrigerating medium over them longitudinally of their length, and utilizing the vertical suspension for insuring the effective drainage of said medium therefrom.

2. The method of treating fish or other goods having one long dimension, which consists in suspending them in substantially vertical position, passing a liquid refrigerating medium over them and moving said fish or other goods transversely of the direction of movement of said medium.

3. The method of treating fish or other goods having one long dimension, which consists in moving them through a liquid refrigerating medium, the latter passing, at the same time, longitudinally of said fish or other goods.

4. The method of treating fish or other goods having one long dimension, which consists in moving them in a direction transverse of their length and moving a liquid refrigerant longitudinally of their length.

5. The method of treating fish or other goods having one long dimension, which consists in moving them, while suspended substantially vertically, successively through cold water and a liquid refrigerating medium.

6. The method of treating fish or other goods having one long dimension, which consists in moving them, while suspended substantially vertically, successively through cold water, a liquid refrigerating medium and cold water.

7. The method of treating fish or other goods having one long dimension, which consists in moving them, while suspended substantially vertically, successively through cold water, a liquid refrigerating medium and cold water, the said liquids passing longitudinally of said fish or other goods while the latter pass therethrough.

8. The method of treating fish or other goods having one long dimension, which consists in moving them, while suspended substantially vertically, successively through cold water, a liquid refrigerating medium and cold water, said liquids passing longitudinally of said fish or other goods while the fish or other goods pass transversely of the direction of flow of said liquids.

9. A method of washing, freezing and glazing fish or other goods having one long dimension, which consists of suspending the said fish or other goods in a substantially vertical position and causing them to travel in succession through chambers wherein respectively cold water, a refrigerating liquid whose temperature is at 0° centigrade or colder, and cold water are caused to shower or spray over the fish or other goods.

10. A method of washing, chilling or freezing, and glazing fish or other goods having one long dimension, which consists in suspending them in a substantially vertical position and causing successively cold water, a refrigerating liquid whose temperature is at 0° centigrade or colder, and cold water to shower or spray over them.

11. A method of washing and chilling or freezing fish or other goods having one long dimension, which consists in suspending them in a substantially vertical position and causing successively cold water, and a refrigerating liquid whose temperature is 0° centigrade or colder, to shower or spray over them.

12. A method of chilling or freezing and glazing fish or other goods having one long dimension, which consists in suspending them in a substantially vertical position and causing successively a refrigerating liquid whose temperature is at 0° centigrade or colder, and cold water to shower or spray over them.

13. A method of glazing fish or other goods having one long dimension, which consists of causing them to pass, while suspended in a substantially vertical position, through cold water which is caused to shower or spray over them.

14. A method of chilling or freezing fish or other goods having one long dimension, which consists in suspending them in a substantially vertical position, causing a refrigerating liquid whose temperature is 0° centigrade or colder, to shower or spray over them and causing the suspended fish or other goods to travel horizontally through the spray.

15. A substantially continual process of chilling or freezing fish or other goods having one long dimension, which consists of suspending them in a substantially vertical position, causing a refrigerating liquid whose temperature is 0° centigrade or colder, to shower or spray over said fish or other goods, causing the suspended fish or other goods to travel horizontally through the shower or spray in a substantially continual process wherein unchilled or unfrozen fish or other goods are continually caused to enter and chilled or frozen fish or other goods continually emerge from the process.

16. A refrigerating apparatus which consists of a conveyor arranged to carry fish or other goods having one long dimension while the said fish or other goods are suspended in a substantially vertical position, perforated or slotted containers from which a refrigerating liquid may be showered on the said fish or other goods while so suspended, refrigerating means so placed as to receive and refrigerate the liquid, circulating pumps to move the refrigerating liquid, and water containers perforated or slotted, and so placed as to shower or spray on the moving fish or other goods for washing or glazing.

17. A refrigerating apparatus which comprises a chamber with perforated or slotted vessels so arranged therein that water or a refrigerating liquid, as desired, is sprayed or showered over fish or other goods, which are suspended therein, and means for collecting and recooling the refrigerating liquid and using it again, or for disposing of the said cold water after it has flowed over the fish or other goods.

18. An apparatus for freezing fish or other goods having one long dimension, which comprises means for suspending them in a substantially vertical position and means for causing a refrigerating liquid or water to shower over the said fish or other goods.

19. An apparatus for freezing fish or other goods having one long dimension, which comprises means for suspending them in a substantially vertical position, means for causing a refrigerating liquid to shower or spray over the said fish or other goods, and means for moving said vertically suspended goods through the said refrigerating shower.

20. An apparatus for freezing fish or other goods having one long dimension, which comprises means for suspending them in a substantially vertical position, means for causing a refrigerating liquid to spray or shower over the said fish or other goods and means for moving said vertically suspended goods through said refrigerating shower transversely to the direction of flow of the latter.

21. In a refrigerating apparatus, means for supporting vertically fish or other goods having one long dimension, a refrigerating chamber, means in said chamber and above said fish or other goods for supplying a liquid refrigerating medium to said fish or other goods, and means for moving the supports for said fish or other goods transversely of the length of said fish or other goods, and from end to end of said chamber.

22. In a refrigerating apparatus, means for supporting vertically fish or other goods having one long dimension, a treating chamber comprising a plurality of zones, means for causing said fish or other goods to move through said zones, means for passing a liquid refrigerating medium longitudinally of the fish or other goods passing through said chamber, means in the bottom of the chamber for lowering the temperature of the medium which has passed over the said fish or other goods, and means for again utilizing the said cooled medium.

23. In a refrigerating apparatus, means for supporting vertically fish or other goods having one long dimension, a treating chamber comprising a plurality of zones, means for causing said fish or other goods to move through said zones, means in one of said zones for passing water over said fish or other goods passing therethrough, and means in another zone for passing a liquid refrigerating medium over the washed fish or other goods.

24. In a refrigerating apparatus, means for supporting vertically fish or other goods having one long dimension, a treating chamber comprising a plurality of zones, means for causing the said fish or other goods to move through the said zones, means in one of said zones for passing a liquid refrigerating medium over the said fish or other goods passing therethrough, and means in another zone for passing water over the said refrigerated fish or other goods.

25. In a refrigerating apparatus, means for supporting vertically fish or other goods having one long dimension, a treating chamber comprising a plurality of zones, means for causing said fish or other goods to move through said zones, means in one of said zones for passing cold water over said fish or other goods passing therethrough, means in another zone for passing a liquid refrigerating medium over the washed fish or other goods, and means in still another zone for passing cold water again over the said washed and refrigerated fish or other goods.

26. In a refrigerating apparatus, means for supporting vertically fish or other goods having one long dimension, a treating chamber comprising a plurality of zones, means for causing said fish or other goods to move through said zones, means in one of said zones for passing cold water over said fish or other goods which are passing therethrough, means in another zone for passing a liquid refrigerating medium over the washed fish or other goods, and means in still another zone for passing cold water again over the washed and refrigerated fish or other goods, all of said media being passed longitudinally over said fish or other goods.

27. In a refrigerating apparatus, a chamber comprising a plurality of zones, supports from which fish or other goods having one long dimension may be suspended in vertical position, conveying means to which said supports may readily be attached and from which they may be readily detached for moving the said supports through the zones of said chamber, and means extending along the upper portion of said chamber for supplying a plurality of liquid media for treating the said fish or other goods as they travel through the zones.

28. In a refrigerating apparatus, a chamber comprising a plurality of zones and having a slot along the upper wall thereof, supports from which comestibles may be suspended in vertical position comprising a supporting bar substantially commensurate with the width of said chamber and a member attached thereto and adapted to extend through said slot, conveying means positioned above the upper wall of said chamber and adapted to receive the comestible support portion extending through the slot for moving said supports through the zones of said chamber, and means extending along the upper portion of said chamber and disposed above the path of travel of said comestibles for supplying the particular medium with which said comestibles are treated in each zone, whereby said comestibles enter one end of said chamber in their original state and are withdrawn at the other end thereof ready for shipment or storage.

29. In a refrigerating system, a treating chamber, means for suspending fish or other goods having one long dimension in a vertical position therein, and means whereby either a refrigerant or water may be distributed thereover, as desired.

30. In a refrigerating system, a treating chamber, means for suspending fish or other goods having one long dimension in a vertical position therein, comprising perforated pipes and double throw valve means whereby either a refrigerant or a washing or glazing medium may be distributed thereover as desired.

In witness whereof, I have hereunto subscribed my name.

HARDEN F. TAYLOR.

Witness:
A. ARNOLD BRAND.